United States Patent [19]

Belfer

[11] Patent Number: 4,870,610

[45] Date of Patent: Sep. 26, 1989

[54] METHOD OF OPERATING A COMPUTER SYSTEM TO PROVIDE CUSTOMED I/O INFORMATION INCLUDING LANGUAGE TRANSLATION

[75] Inventor: Daniel F. Belfer, Piscataway, N.J.

[73] Assignee: Bell Communications Research, Inc., Livingston, N.J.

[21] Appl. No.: 88,821

[22] Filed: Aug. 25, 1987

[51] Int. Cl.⁴ ............................................. G06F 15/38
[52] U.S. Cl. .................................. 364/900; 364/920.4; 364/920.1; 364/927.4; 364/419; 434/156; 434/157
[58] Field of Search ................ 434/156, 157; 364/419, 364/521, 200 MS File, 900 MS File

[56] References Cited

U.S. PATENT DOCUMENTS

| 4,334,286 | 6/1982 | Kerigan et al. | 364/900 |
| 4,412,305 | 10/1983 | Yoshida | 364/900 |
| 4,468,754 | 8/1984 | Asada et al. | 364/900 |
| 4,599,612 | 7/1986 | Kaji et al. | 340/723 |
| 4,644,492 | 2/1987 | Murata | 364/900 |

FOREIGN PATENT DOCUMENTS 0217174 4/1987 European Pat. Off. .............. 364/
2729809 1/1978 Fed. Rep. of Germany .

OTHER PUBLICATIONS

INSPEC., Abstract No. 81080829, Witten et al., "An Ideagraphic Language Front End Processor for Accessing English Language Computer Systems", Feb. 1981.

Kwang-Ya Fang, "The THOR Template Editor", AFIPS Conference Proceedings, 1985, National Computer Conference, Jul. 15-18, 1985, pp. 473-479.

Primary Examiner—Eddie P. Chan
Assistant Examiner—Christina M. Eakman
Attorney, Agent, or Firm—James W. Falk; John T. Peoples

[57] ABSTRACT

A method of operating a computer system to effect user-customization, primarily foreign language translation, of standard system-supplied screen displays without the need to modify underlying system source code. A transition environment includes an autonomous processor (250) interposed between a host system (100) and access devices (201,202). Information transmitted between the host and access device is diverted to the processor for intermediate processing. One phase of this processing generates a translation file (500) which stores a mapping relationship between a first language screen and its second language counterpart. This translation file is invoked during the secod processing phase to effect a translation from the first-to-second language upon a host response and from the second-to-first language upon a host request.

7 Claims, 14 Drawing Sheets

FIG. 2

```
/FOR: GCOCS1            * TIRKS ORDER CONTROL (SPECIALS) * OIY: _     06/11/87 09:17
CLO:            ORD:                        CKT/SEG:           CKLS:          TIM CNT:
SUPPLEMENT: ID:     ACTN:              ORIG:
***************************** ORDER LEVEL ***********************************
ORD TYP: _ SLS/ORIG:         CUST:            INTVL:          RAC:      NPA:      PCF: _
APP:       DD/MDFR:          SWC:             MR01:      MR02:     MR03:     DOP: _
WCO:     ECO:    TRO:    OCO:       CCO:          T/E: _ WK GRP:          ND/NW: _
ISC/OCC: _ DOC:     REL ORD:        JOBID:          SID JEP:
LATA:       PROJ:                   EIRD:          AD:       TRID:
ID:       SID:       LAM:           FCD:           PTD:      CTA:
RID:      DVA:       WOT:                          RT OPT: _ EX SYS:        RI:
IAD:                                                                        OSTAT:
REMARKS:
***************************** CIRCUIT LEVEL *********************************
CKT:       CID:                                                        FMT:    ACTN:
QTY:       OLD ID:                                                     FMT:
LOC A:              LOC Z:           DR:       PULS:     DIB:
C/S: INV: _ EAC: _ CCR#: _          EX SYS:    CAC:                            CSTAT:
REMARKS:
***************************** WORK LOCATION LEVEL ***************************
CKL/CWL LOCATION    LSO    IND   LRO   IRO   ERO   PR01 PR02 MR01 MR02 MR03 LSTAT
```

FIG. 3

```
/FOR: GCOCS1        * TIRKS CONTROL DE ORDEN (ESPECIALES) * OIY: _    11/06/87 09:17
CLO:          ORD:           CIR/SEG:           CKLS:            ITM CNT:
SUPLEMENTO: ID:    ACCN:
***************************** NIVEL DE ORDEN ************************************
TIPO ORD: _ VEN/ORIG:           CLIENTE:                        CLAV-INF:
PETICION:        SERV/MOD:         SWC:       INTVL:          PCF: _
WCO:       ECO:     TRO:     OCO:     CCO:      MRO1:      MRO2:      MRO3:
ISC/OCC: _ DOC:     ORD REL:                                        A/C:       DOP:
LATA:         PROY:                               T/E: _ WK GRP:       ND/NW: _
ID:         SID:         LAM:        EIRD:       AD:        TRID:       RI:
RID:        DVA:         WOT:        FCD:        PTD:       CTA:
IAD:     ID TRABAJO:              SID JEP: _ RT OPT _ SIS EX:       ESTA-O:
COMENT:
***************************** NIVEL DE CIRCUITO **********************************
CIR:        ID-C:                                              FMT: _ ACCN:
CANTIDAD:    ID-C ANT:                                                 FMT: _
LOC A:           LOC Z:              DR:        PULS:    DIB:
C/S:  INV:   EAC: _ CCR#:        SIS EX:       CAC:               ESTA-C:
OBSERVACIONES:
***************************** NIVEL DE UBICACION (DEL TRABAJO) *******************
CKL/CWL LOCALIDAD  LSO    IND  LRO  IRO  ERO  PRO1 PRO2 MRO1 MRO2 MRO3 ESTA-L
```

FIG. 6

| CHARACTER DATA LOCATIONS | ROW | SCREEN IMAGE COLUMNS |
|---|---|---|
| | | 　　　　　　　　　　　　2 4 6 8 10　　　　　　　20　　　30　　　40　　　50　　　　79<br>　　　　　　　　　　　　1 3 5 7 9 11　　　　　21　　31　　41　　51　　　　80 |
| 1-80 | 1 | /FOR: GCLOGO　　...　　* GOC LOGON/OFF *　DATE: 022587　　... |
| 81-160 | 2 | |
| 161-240 | 3 | |
| 241-320 | 4 | ENTER ARO: ___ |
| ... | 5 | |
| | 6 | |
| 481-560 | 7 | ENTER PASSWORD: _____ |
| | 8 | (IF REQUIRED) |
| ... | 9 | |
| | 10 | |
| 801-880 | 11 | MAIL FETCH?: _ |
| | 12 | |
| ... | 13 | |
| 1041-1120 | 14 | PF KEY ASSIGNMENT |
| | 15 | |
| ... | 16 | |
| 1281-1360 | 17 | 1:　FIND　　　-DISPLAY LOGON STATUS |
| | 18 | 4:　ADD　　　　-LOGON |
| | 19 | 8:　REFRESH　　-REFRESH SCREEN |
| | 20 | 10: DELETE　　　-LOGOFF |
| ... | 21 | |
| | 22 | |
| | 23 | |
| 1841-1920 | 24 | |

FIG. 8

| CHARACTER DATA LOCATIONS | ROW | AUXILIARY IMAGE COLUMNS 2 4 6 8 10 ... 20 ... 30 ... 40 ... 50 ... 79<br>1 3 5 7 9 11 21 ... 31 ... 41 ... 51 ... 80 |
|---|---|---|
| 1-80 | 1 | /FOR: GCLOGO       * GOC LOGON/OFF *  DATE: ▨ |
| 81-160 | 2 | |
| 161-240 | 3 | |
| 241-320 | 4 | ENTER RRO: ▨ |
| ... | 5 | |
| | 6 | |
| 481-560 | 7 | ENTER PASSWORD: ▨ |
| | 8 | (IF REQUIRED) |
| ... | 9 | |
| | 10 | |
| 801-880 | 11 | MAIL FETCH?: ▨ |
| ... | 12 | |
| | 13 | |
| 1041-1120 | 14 | PF KEY ASSIGNMENT |
| ... | 15 | |
| | 16 | |
| 1281-1360 | 17 | 1:  FIND     -DISPLAY LOGON STATUS |
| | 18 | 4:  ADD      -LOGON |
| | 19 | 8:  REFRESH  -REFRESH SCREEN |
| | 20 | 10: DELETE   -LOGOFF |
| ... | 21 | |
| | 22 | |
| | 23 | |
| 1841-1920 | 24 | |

FIG. 9

TRANSLATED IMAGE COLUMNS

| CHARACTER DATA LOCATIONS | ROW | 2 4 6 8 10<br>1 3 5 7 9 11 ... | 20<br>21 ... | 30<br>31 ... | 40<br>41 ... | 50<br>51 | 79<br>80 |
|---|---|---|---|---|---|---|---|
| 1-80 | 1 | | | | | | |
| 81-160 | 2 | | | | | | |
| 161-240 | 3 | | | | | | |
| 241-320 | 4 | /FOR: GCLOGO | * GOC LOGON/OFF | | * FECHA: 250287 | | |
| ••• | 5 | | | | | | |
| ••• | 6 | | | | | | |
| 481-560 | 7 | ENTRAR ARO: --- | | | | | |
| | 8 | | | | | | |
| | 9 | ENTRAR PALABRA DE PASO: -------- | | | | | |
| | 10 | (SI ES REQUERIDO) | | | | | |
| 801-880 | 11 | EXTRAER CORRESPONDENCIA?: - | | | | | |
| | 12 | | | | | | |
| ••• | 13 | | | | | | |
| 1041-1120 | 14 | ASIGNACION DE LAS TECLAS PF | | | | | |
| | 15 | | | | | | |
| ••• | 16 | | | | | | |
| 1281-1360 | 17 | 1: CONSULTAR -MUESTRA EL ESTADO DEL LOGON | | | | | |
| | 18 | 4: ANADIR -LOGON | | | | | |
| | 19 | 8: REPONER -REPONER LA PANTALLA | | | | | |
| | 20 | 10: ANULAR -LOGOFF | | | | | |
| ••• | 21 | | | | | | |
| | 22 | | | | | ••• | |
| | 23 | | | | | | |
| 1841-1920 | 24 | | | | | | |

FIG. 10

```
/FOR: GCOCS1        * TIRKS CONTROL DE ORDEN (ESPECIALES) * OIY: _    11/06/87 09:17
CLO: tps        ORD: b                        CIR/SEG: ____    CKLS: ____    ITM CNT: ____
SUPLEMENTO: ID: ____    ACCN: ____                        ORIG: ____
***************************** NIVEL DE ORDEN *********************************************
TIPO ORD: a  VEN/ORIG: jas         CLIENTE: bac-i              CLAV-INF: ____
PETICION: 110687 SERV/MOD: 150687    SWC: ____    INTVL: ____    PCF: _
WCO: wro ECO: ero TRO: ____    OCO: ____    CCO: cro MRO1: ____    MRO2: ____    MRO3: ____
ISC/OCC: _ DOC: ____    ORD REL: ____                            A/C: ____    DOP: ____
LATA: ____    PROY: ____                                T/E: _ WK GRP: ____    TRID: ____  ND/NW: _
ID: ____    SID: ____    LAM: ____        EIRD: ____    AD: ____    PTD: ____    CTA: ____    RI: ____
RID: ____    DVA: ____    WOT: ____        FCD: ____    PTD: ____        SIS EX: ____        ESTA-O: ____
IAD: ____    ID TRABAJO: ____                SID JEP: ____    RT OPT _
COMENT: ____
***************************** NIVEL DE CIRCUITO ******************************************
CIR: 001  ID-C: 01/plnt/201/981/7345                            FMT: t ACCN: a_
CANTIDAD: ____    ID-C ANT: ____                                            FMT: _
LOC A: p          LOC Z: sm              DR: msgis PULS: ____    DIB: ____
C/S: ____    INV: ____    EAC: _ CCR#: ____        SIS EX: ____    CAC: ____        ESTA-C: ____
OBSERVACIONES: ____
***************************** NIVEL DE UBICACION (DEL TRABAJO) ***************************
CKL/CWL  LOCALIDAD  LSO    IND  LRO  IRO  ERO  PRO1 PRO2 MRO1 MRO2 MRO3 ESTA-L
```

FIG. 11

```
/FOR: GCOCS1          * TIRKS ORDER CONTROL (SPECIALS) *  OIY:         06/11/87 09:20
CLO: TPS 200831 ORD: TPS200831           CKT/SEG: 001 CKLS:           ITM CNT:
SUPPLEMENT: ID:     ACTN:                        ORIG:
**************************** ORDER LEVEL ******************************************
ORD TYP: A SLS/ORIG: JAS       CUST: BAC-I                      RAC:           PCF: Y
APP: 061187 DD/MDFR: 061587    SWC:           INTVL:               NPA:        DOP:
WCO: WRO ECO: ERO TRO:    OCO:           CCO: CRO MRO1:    MRO2:    MRO3:
ISC/OCC:    DOC:      REL ORD:                        T/E:    WK GRP:    ND/NW:
LATA:      PROJ:                JOBID:                SID JEP:
ID:       SID:      LAM:        EIRD:           AD:           TRID:
RID:      DVA:      WOT:        FCD:            PTD:          CTA:
IAD:                                         RT OPT: N EX SYS:         RI:
REMARKS:                                                               OSTAT: P
**************************** CIRCUIT LEVEL *****************************************
CKT: 001   CID: 01/PLNT/201/981/7345                         FMT: T ACTN: A
QTY:       OLD ID:                                           FMT:
LOC A: PISCNJMT        LOC Z: SMVLNJMT       DR: MSGIS PULS:  DIB:
C/S: C INV: Y EAC:     CCR#:                 EX SYS:       CAC: SMN4RS9
REMARKS:                                                               CSTAT: P
**************************** WORK LOCATION LEVEL ***********************************
CKL/CWL LOCATION    LSO      IND   LRO  IRO  ERO   PRO1 PRO2 MRO1 MRO2 MRO3 LSTAT

GOCO014I ORDER AND ITEM(S) ADDED SUCCESSFULLY
```

FIG. 12

```
/FOR: GCOCS1      * TIRKS CONTROL DE ORDEN (ESPECIALES) * OIY:      11/06/87 09:20
CLO: TPS 200831 ORD: TPS200831          CIR/SEG: 001 CKLS:           ITM CNT:
SUPLEMENTO: ID:     ACCN:                    ORIG:
*********************** NIVEL DE ORDEN ***********************************
TIPO ORD: A VEN/ORIG: JAS      CLIENTE: BAC-I              CLAV-INF:
PETICION: 110687 SERV/MOD: 150687      SWC:       INTVL:         PCF: Y
WCO: WRO ECO: ERO TRO:      OCO:      CCO: CRO MRO1:    MRO2:      MRO3:
ISC/OCC:     DOC:     ORD REL:                              A/C:       DOP:
LATA:                                                  T/E:  WK GRP:    ND/NW:
ID:       SID:       LAM:            EIRD:      AD:          TRID:
RID:      DVA:       WOT:            FCD:       PTD:         CTA:
IAD:      ID TRABAJO:              SID JEP:     RT OPT N SIS EX:      RI:
COMENT:                                                      ESTA-O: P
******************** NIVEL DE CIRCUITO ***********************************
CIR: 001  ID-C: 01/PLNT/201/981/7345                       FMT: T ACCN: A
CANTIDAD:  ID-C ANT:                                                FMT:
LOC A: PISCNJMT    LOC Z: SMVLNJMT    DR: MSGIS PULS:    DIB:
C/S: C INV: Y EAC:      CCR#:         SIS EX:       CAC: SMN4RS9   ESTA-C: P
OBSERVACIONES:
*************** NIVEL DE UBICACION (DEL TRABAJO) *************************
CKL/CWL  LOCALIDAD  LSO       IND  LRO  IRO  ERO  PRO1 PRO2 MRO1 MRO2 MRO3 ESTA-L

GOCO014I RESULTADO ADICION DE LA ORDEN E ITEM(S)
```

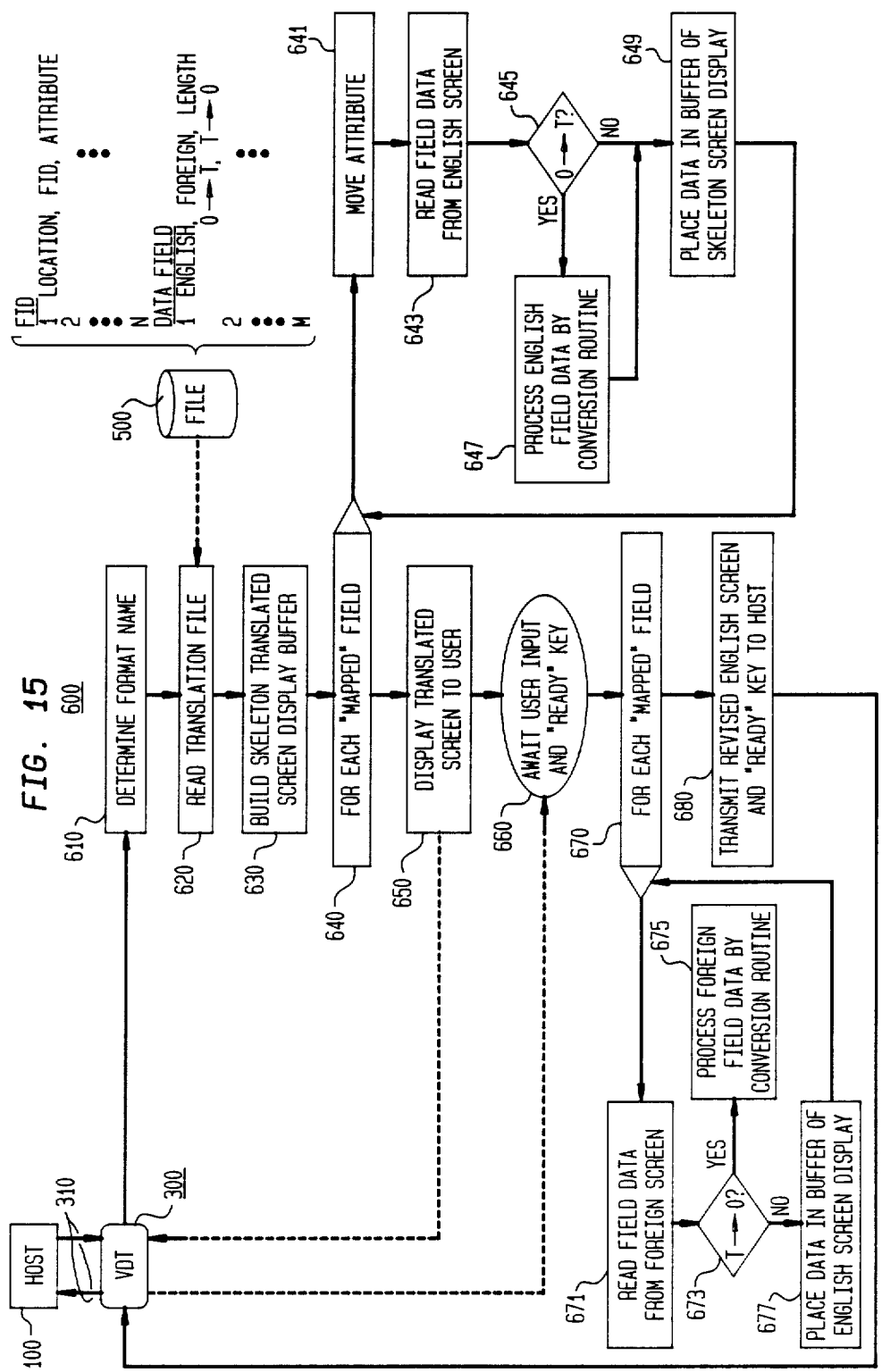

METHOD OF OPERATING A COMPUTER SYSTEM TO PROVIDE CUSTOMED I/O INFORMATION INCLUDING LANGUAGE TRANSLATION

FIELD OF THE INVENTION

This invention relates generally to input/output interfaces of a computer system and, more particularly, to a methodology for effecting user-customization, including foreign language translation, of system-supplied screen displays without modification to underlying system source code.

BACKGROUND OF THE INVENTION

In most computer systems involving a central host processor and numerous distributed access devices such as video display terminals, information is transferred between the host and each access device via a screen display formed as an integral part of the access device. The screen serves the two-fold purpose of displaying input information provided by a user as well as displaying user-readable output information, generated by host processing, to the user. The input information is generally provided by the user via entries on a keyboard also formed as an integral part of each access device. Input or output information is typically composed of an arrangement of system-provided words or phrases followed by user or system-supplied data fields displayed in a predetermined pattern on the screen.

In conventional systems, an application executing on the host utilizes only a limited number of screen patterns or formats so that only a standard set of screen images corresponding to the formats may be called into view by the user for input or invoked by the host processing for output. The definition of each screen format is typically deeply embedded in the source code for the application. There is essentially no flexibility provided to the user to allow for the creation of customized formats and, correspondingly, their screen images.

In order to expand the user base of a previously developed software application system, particularly to allow foreign affiliates of the system developer full utilization of system capabilities, major modifications to the source code of the system have conventionally been required, such as by rewriting significant portions of the code implementing input/output (I/O) interface functions.

The foremost modification in the above special situation is that of translating the descriptive words or phrases from the original language (e.g., English) to the language (e.g., Spanish) of the foreign affiliate. If there are affiliates from numerous foreign countries then, besides the effort of rewriting the source code, multiple copies of modified source code require storing, tracking and updating. Such a task becomes unwieldly, burdensome and costly. Thus, for example, if a source code module uses or produces user-viewable information, then there must be a different copy of the module for each language executable by that software. Besides the actual system copies of the code, support software is required to inform the system developer of the status of the multiple copies. Moreover, additional storage devices are needed to store all the additional versions of the software. For a large scale system involving millions of lines of code and thousands of modules, the storage requirements may become enormous.

In addition to the problem of direct language translation, there are also problems as how to treat the data supplied to the data fields. It is usually required that certain data be converted, such as by converting from non-metric to metric, and other data be reordered, such as month/day/year versus day/month/year which is the convention of some foreign affiliates.

The solutions to these problems have not been addressed under the constraint of no impact upon underlying source code, that is, having a translation process which is transparent to the host system.

SUMMARY OF THE INVENTION

The above-described problems and other shortcomings and limitations of the conventional methods for expanding the user-base of existing system source code by rewriting the affected portions of the code are obviated, in accordance with the principles of the present invention, by utilizing a translation environment which serves to buffer the host system to each of the access devices.

Broadly speaking, the translation environment includes an autonomous processor interposed between the host system and each access device. Information transmitted in either direction between the host and access device is diverted to the processor for intermediate processing. The diverted information contains detailed character data either appearing on the input request screen originated at the access device or on the output response screen destined for the access device, depending upon the direction of original information transmission. The character data is of two types, namely, system-supplied field identifiers and user-provided data entries associated with the identifiers. Identifiers are expressed in a first user language (e.g., English).

In order to offer access to the host system by a user of a second language (e.g., Spanish), the screen displays and, most particularly, the identifiers are first translated to the second language via a format create process. The output of this create process is a translation file which stores the mapping relationship between the first language screen and its second language counterpart.

The translation file is invoked by a translation execution process whenever the second language user accesses the host system. The contents of this file are used to translate from the second-to-first language upon a host request and from the first-to-second language upon a host response.

A feature of this arrangement is that both the format create process and the translation execution process operate in the translation environment which is transparent to the host system. With the translation environment, the user may customize screen displays to maximize system utilization.

The organization and operation of this invention will be better understood from a consideration of the detailed description of the illustrative embodiment thereof, which follows, when taken in conjunction with the accompanying drawing.

BRIEF DESCRIPTION OF THE DRAWING

FIG. 2 depicts one of the many user-invoked screen displays as it is received from the host system and presented on an access device;

FIG. 3 is the counterpart to FIG. 2 after data fields have been populated by the user, the populated screen has been transmitted to the host, and the processed version of the data is returned to the user for viewing;

FIG. 6 depicts an unfilled screen display resulting from a standard request-response activity initiated by the user of the system of FIG. 1;

FIG. 8 is the auxiliary image counterpart of the original image of FIG. 6 as generated by the format create controller;

FIG. 9 is the translated image counterpart of the original image of FIG. 6 as generated by the format create controller and supplementary input from the user;

FIG. 10 depicts the translated image corresponding to the screen display of FIG. 2;

FIG. 11 depicts an exemplary, filled-in version of the image presented in FIG. 10 prior to processing by the host system;

FIG. 12, which corresponds to FIG. 3, depicts the translated screen image after the contents of the display in FIG. 11 have been processed by the host system;

FIG. 15 is a block diagram representing the detailed processing effected by the translation execution processing depicted generically in FIG. 14.

DETAILED DESCRIPTION

To place in perspective the detailed description of the present invention, it is instructive to provide a basic understanding of user interaction with a conventional, screen-oriented distributed system. Accordingly, the first part of this detailed description discusses the I/O interface of an exemplary system patterned after an existing conventional large scale system. This approach has the added advantage of introducing terminology and notation that will aid in elucidating the various aspects of the present invention.

1. Conventional Arrangement

Figure 1:
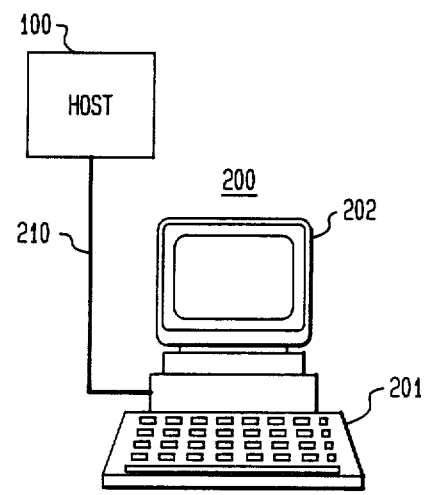
FIG. 1 depicts a prior art arrangement wherein the host system is connected to one of a plurality of distributed access devices.

Initially, as depicted in FIG. 1, the point of view taken is that of a user as the user prepares to interact with the host system 100 utilizing video display terminal (VDT) 200. In this conventional arrangement, VDT 200 is a so-called "passive" terminal in that there is no local computing capability associated with VDT 200. Host 100 is accessible from VDT 200 via interposed channel 210. Input information for host 100 is generally entered by the user via keyboard 201 and output information produced by host 100 is displayed in character format on video screen 202. Input information is also displayed on screen 202 prior to transmission to host 100. If a representative computer upon which host system software resides is an IBM Model 3084 having the OS/MVS type operating system, then representative of VDT 200 is an IBM Model 3279 Color Display Terminal, which is connected to host 100 via an IBM 3274-type Controller serving as channel 210.

In order to enable the user to input data and receive output in a uniform manner, several types of so-called formats may be called into view on VDT 200. The user requests a format by spelling out the format name via the keyboard and then strikes the appropriate "enter" key, thereby transferring the request to host 100 over channel 210.

As an example, it is supposed that the initial input to host 100 is a request to "log-on". For log-on, the user must supply identifying information so that host system 100 may verify that the requesting user is a valid user. Thus, if the user enters, for instance, the log-on format name "gclogo", then the following excerpted response is returned by host 100 and displayed on screen 202 (the underbars indicate where a user is to make entries):

---
DISPLAY 1
* GOC LOGON/OFF *
ENTER RRO: ____
ENTER PASSWORD: ____
PF KEY ASSIGNMENT
1 : FIND         - DISPLAY LOGON STATUS
4 : ADD          - LOGON
8 : REFRESH      - REFRESH SCREEN
10: DELETE       - LOGOFF
---

The user supplied fields have the following meanings:
RRO—Responsible Reporting Office (i.e., user identification)
PASSWORD—valid password to enable the user to access host system 100.

The information with the heading "PF KEY ASSIGNMENT" (PF means Program Function) lists the allowed response keys which then initiate one of the following actions:
FIND—Displays requested RRO
ADD—Log-on to host system
REFRESH—Clear all fields on the screen
DELETE—Log-off host system It is supposed that the user responds first by entering data in the two fields, namely, RRO is filled in with, for example, the three character string "DFB" and PASSWORD contains the six character string "PASSWD", and then the user strikes the "PF4" key.

In general, screen display 202 may contain up to 1920 character positions as determined by 24 lines per screen at 80 characters per line. VDT 200 recasts the characters as well as the character position information into a form suitable for transmission over channel 210. The striking of the "PF4" key by the user signifies that the user has completed the screen entries and that the character information is to be converted within VDT 200 and then transmitted over channel 210 to host 700.

If the information supplied by the user at "log-on" is complete and accurate so that it is acceptable to host 100, the next response returned by host 100 to VDT 200 is shown in excerpted form in DISPLAY 2, which is essentially DISPLAY 1 above augmented with the additional line (line 24 of the screen display):

---
DISPLAY 2
* GOC LOGON/OFF *
---

```
    -continued
ENTER RRO: ___
ENTER PASSWORD: ___
PF KEY ASSIGNMENT
1: FIND          - DISPLAY LOGON STATUS

GC101011 LOGON SUCCESSFULLY COMPLETED
```

After successful log-on, the user is now prepared to select the next work activity. It is important, however, at this juncture to reiterate some characteristics of the user utilization of host system 100. As depicted, accessing is interactive in that a user submits input information viewable on a screen, evaluates a response viewable on the same screen, then supplies another input, and so forth. The screen information must be presented in human readable format so the user may understand and interpret responses, and thereby plan and submit the subsequent work activity.

Presuming log-on is successful, the user now moves to the next work iteration. For this step, a new blank format is called into view. By way of another example, the user types the new format name, now designated "gcocs1", and strikes the appropriate enter key. Host 100 responds with the requested format and it is displayed on screen 202; FIG. 2 depicts the exemplary version of the screen as provided by host 100.

The unpopulated format screen of FIG. 2 comprises capitalized acronym fields each followed by a colon; for example, "OIY","CLO", . . . ,"CKT", . . . ,"REMARKS" and "CSTAT" are screen fields. These acronyms are referred to generically as Field Identifiers (FIDs). (The first FID, namely /FOR, is a special identifier which is filled-in and returned by the host to remind the user of the format under consideration.) Underscored locations following the FIDs comprise data fields for the user-supplied data. Not all data fields are filled in every instance and they may remain blank upon submission to host 100.

When the unfilled screen is first received by VDT 200, certain data fields have a series of underbars to indicate where data may be entered and the total length of acceptable data. Data fields with these underbars are referred to as unprotected data fields, that is, fields for which it is expected that the user may supply input information. There is another type of data field, designated as a protected field, which the user cannot populate, but which displays output data from host 100. The two data fields in the upper right corner of FIG. 2, namely, the "date" and "time" data fields, are examples of protected data fields.

It is not important at this juncture to define the meanings of the FID acronyms. Rather, the concept to understand is that for each type of format, whenever the format is requested, FIDs are displayed with indicators as to the position and length of anticipated data, and the user enters only the subset of data deemed appropriate by the user. After the user is satisfied with the data entries, the contents of screen 202 are transmitted to host 100 via an appropriate Program Function Key.

In order to introduce other aspects of the present invention to be discussed in detail later, a filled, submitted and executed counterpart to FIG. 2 is shown in FIG. 3. In FIG. 3, certain data fields are shown as filled—by either the user upon input or by host 100 upon generating a response. The last line (so-called "line 24"), however, is a system generated response (the line containing ORDER AND ITEM(S) ADDED SUCCESSFULLY). Oftentimes messages that appear on the bottom line must be constructed by the application executing on host 100. Messages are not simply placed in a look-up table, but must be pieced together dynamically. Thus, the translation of the English version of a message to a foreign language is not a straight-forward procedure. Since messages are constructed from individual words or phrases, a simple translation of each word or phrase as it appears and then concatenating the translated words and phrases leads to a confusing, if not erroneous, message in the foreign language.

Although messages may not be directly translated and therefore require special handling because of this non-table look-up environment, it is generally possible to directly translate FIDs. However, translated FIDs may still pose a problem because foreign word or phrase lengths generally differ from their English version counterparts. Moreover, linguistic interpretation may have more meaning if the translated FIDs are positioned at different screen locations. Finally, it may be necessary to process different units of data (e.g., meters versus feet) and different order of data (e.g., month-day-year versus day-month-year) in translating between the English and the foreign language counterpart. If all word/phrase translations, FID location changes and data conversions are effected in a manner that is transparent to host 100, then no modification to the underlying source code of host 100 is required.

Associated with each FID and with each data field of either the protected or unprotected type is a so-called attribute. The attribute parameter is a standard feature of the Model 3279 data stream in communicating between host 100 and VDT 200. Each attribute, although not actually displayed on screen 202, summarizes display information about its corresponding FID or data field, including such information as the color of the display characters at the FID or data field locations and whether or not to highlight the associated characters. As an indication of the association of attributes with FIDs and data fields, a portion of the second line from FIG. 3 is shown below with the location of each attribute in the line shown with an exclamation symbol:

!CLO:!TPS!200831!ORD:!TPS200831! . . .

In this representation, the exclamation symbol before each FID or data field identifies the storage location (one of the possible 1920 screen locations) for its associated attribute. Moreover, attributes grouped as pairs are considered as marking or encompassing FID and data field locations. For instance, the attribute for the data field having "TPS" as data and the attribute for the data field having "200831" as data encompasses the "TPS" data field (!TPS!). Thus, pairs of consecutive attributes act as spacers, so a search over a screen display to locate a FID or data field may be effected by identifying the locations of consecutive attributes. This capability will be utilized later by one aspect of the present invention.

2. Illustrative Embodiment of the Present Invention

In FIG. 1, the user is viewed as communicating with host 100 in an interactive mode via VDT 200 which, in turn, maintains an on-line connection to host 100 over channel 210.

Figure 4:
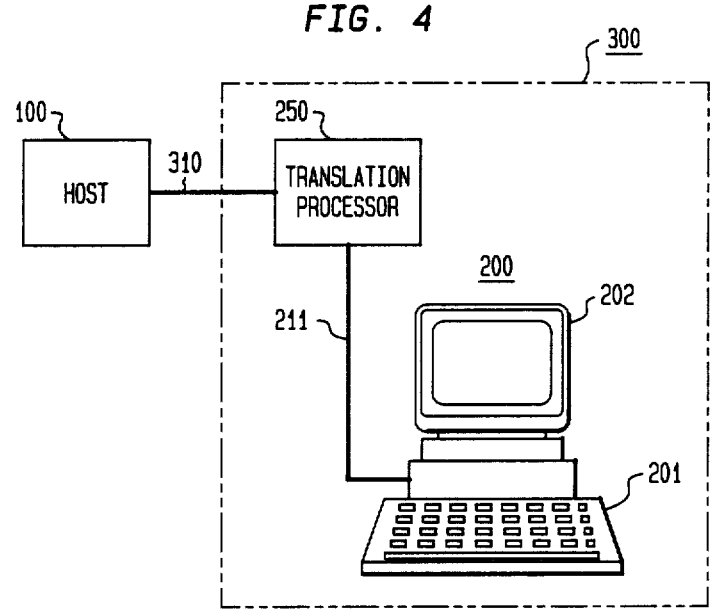
FIG. 4 depicts a screen-driven translation environment, in accordance with an illustrative embodiment of the present invention, for translating from a first user interface language to a second user interface language.
Figure 5:
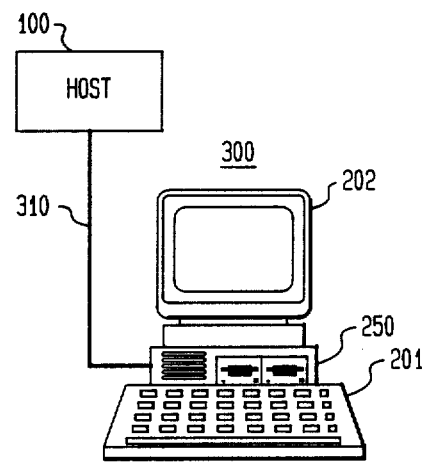
FIG. 5 depicts the personal-computer based implementation of the screen-driven translation process in accordance with the present invention.

Now, with reference to FIG. 4, the user is viewed as still operating VDT 200, but translation processor 250 is now interposed between host 100 and VDT 200. Translation processor 250 is linked to VDT 200 via channel 211 and is linked to host 100 via channel 310. Channels 211 and 310 operate in basically the same manner as channel 210. FIG. 4 represents the most general configuration according to the present invention in that processor 250 is shown as a stand-alone processing element. However, in the illustrative embodiment to be discussed, processor 250 is actually implemented by the on-board personal computer portion of an IBM 3270 PC Terminal. This particular terminal also comprises a screen display and a keyboard that function as screen 202 and keyboard 201, respectively. Accordingly, as depicted in FIG. 5, VDT 300 is shown as an integrated unit comprising previously described elements 201 and 202 as well as local computer 250. VDT 300 is linked to host 100 via channel 310, which is again an IBM 3274-type Controller for this illustrative embodiment.

In the processing environment engendered by processor 250, digital data propagating between host 100 and screen display 202 over channel 310 is, in effect, intercepted and diverted to processor 250 for intermediate processing. Once processed by processor 250, the new data corresponding to the intercepted data is redirected to the element (either host 100 or screen 202) that was originally to receive the data.

For the illustrative embodiment, the intermediate processing is subdivided into two major processes executed serially. The first process allows the user to customize the screen formats; possible customizations include FID translations/modifications, data field movements/deletions and data field conversions. The results of the first process produce a file containing the information needed to translate from the original screen to the customized screen and vice versa during the actual translation execution processing, the second major processing stage, which will be discussed shortly.

Format Create Processing

To provide visual insight into this first process, reference is first made to FIG. 6. In FIG. 6, a complete, standard version of the "gclogo" format image is shown (recall only an excerpted version was shown in DISPLAY 1) as this format appears on screen display 202 when requested by a user. (For consistency of terminology, the "format" is what is defined by source code and the "image" is the actual appearance of the "format" on the screen display.) Screen rows are labeled 1-24 whereas screen columns are labeled 1-80. Associated with rows 1-24 are the corresponding character data locations. For instance, row 1 contains locations 1-80, row 2 has locations 81-160, . . . , and row 24 has locations 1841-1920. Locations shown with underbars represent unprotected data fields that may be filled by the user. For instance, locations 252-254 are reserved for RRO data. Also, as an example of a protected data field, locations 46-51 are used to display the current date in the protected date data field.

Figure 7:
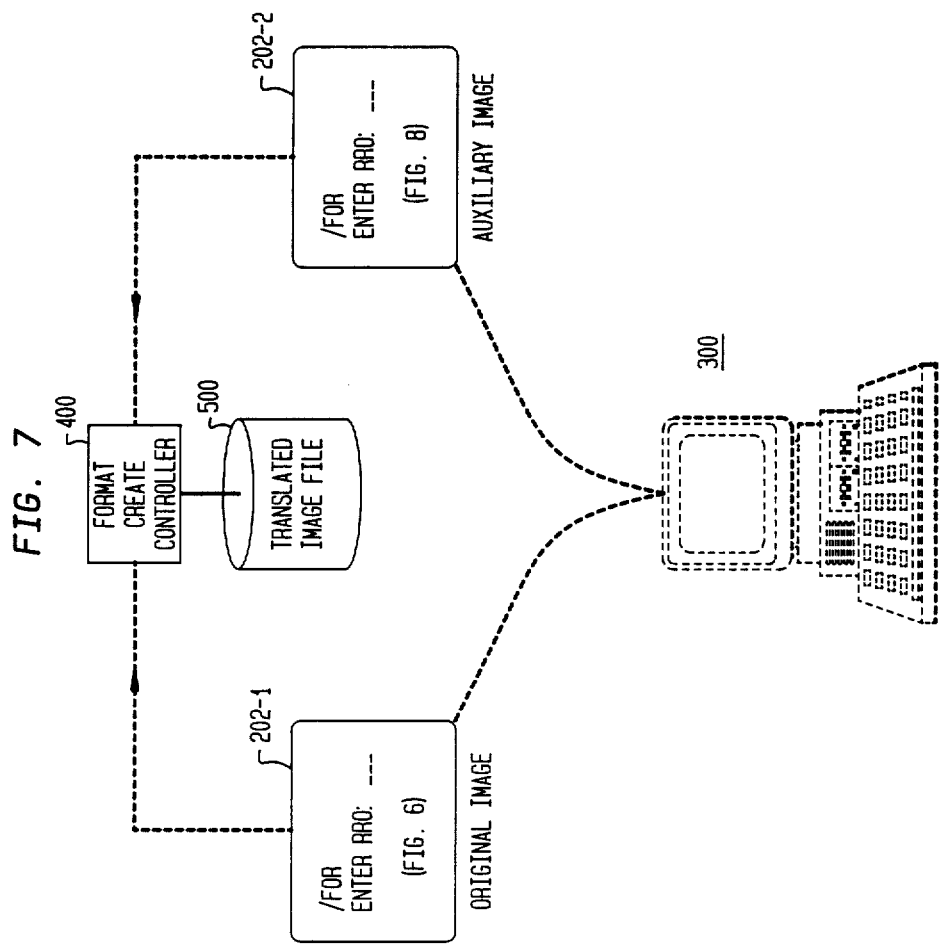
FIG. 7 is a pictorial representation of screen images invoked by the format create controller.

The screen of FIG. 6 is an unfilled original screen image displayed as a result of the standard format request-response procedure occurring between host 100 and VDT 300, as described in the previous subsection for host 100 and VDT 200. Once displayed, the user may begin the process of translating from the original screen image to the so-called translated screen image. FIG. 7 provides a pictorial representation of the screen images invoked by the first process, which is the so-called format create process as implemented by format create controller 400 of FIG. 7. As suggested by FIG. 7, there are two related screen images that are accessible during the format create process, namely, original image 202-1 and auxiliary image 202-2. Either may be called alternately into view on screen display 202. As suggested by FIG. 7, exemplary screen images 202-1 and 202-2 have more detailed counterparts as shown in FIGS. 6 and 8, respectively.

With reference to FIG. 8, a complete screen image counterpart to the original screen image of FIG. 6 is depicted. This image is designated as the auxiliary screen image and it is the initial working screen presented to the user so the user may begin the activity of screen image translation to arrive at the final or translated screen image; thus, the auxiliary image is transitory or ephemeral in nature. The image of FIG. 8 results from invoking create controller 400 to process the screen contents of FIG. 6. In FIG. 8, all unprotected data fields are highlighted by "slash" shading (e.g., the fields following "RRO" and "PASSWORD"). Highlighted fields indicate those data fields that are to be automatically mapped from the original image to the translated image during the translation process (discussed shortly). The user can, however, highlight normally protected fields such as the field following the "DATE" FID (shown with "backslash" shading in FIG. 8). Protected but highlighted fields will also be mapped upon phase two or translation processing.

FIDs may be changed from their English spelling to any other desired combination of characters. FIDs in a foreign language will generally be longer than their equivalent English FIDs. This requires that create controller 400 have the capability to move FIDs, under user control, to other screen locations. For example, controller 400 is generally arranged with a screen editor that allows the user to "mark" a FID to be moved, position the screen cursor to a desired new location and then depress the required "move" key to relocate the FID. Similarly, data fields may be marked and moved. Create controller 400 keeps track of both data fields and FIDs in the original image as well as their locations on the auxiliary image, which when finalized by the user, becomes the translated image.

Unprotected and protected data fields as well as FIDs may be blanked out during translation processing. Again, the screen editor of create controller 400 is implemented with an appropriate blanking key.

Each highlighted field may be converted (e.g., yards to meters) during translation execution mapping. Such a field may be converted during original-to-translation or translation-to-original processing during the translation execution phase. The screen editor of create controller 400 is again utilized to define the desired conversion formula. One particularly important data field requiring a special conversion procedure is the message line or line 24 shown highlighted in FIG. 8. As alluded to earlier, concatenated versions of translated English words and phrases may not produce correct foreign versions. To handle this situation, a message field database is constructed for all the potential messages and a message field converter processes this database by keying on a set of predefined positions in the English messages. The database takes into account multiple messages having similar keys as well as messages having data fields.

To summarize aspects of the above discussion, reference is made to FIG. 9. FIG. 9 represents the translated, Spanish version counterpart to the original image of FIG. 6 after the auxiliary image of FIG. 8 has been translated by the user. In row 1 of FIG. 9, at locations 40-45, the word "FECHA" has replaced the FID "DATE" shown in locations 41-45 of FIG. 8. As is also witnessed in comparing FIGS. 8 and 9, FIDs have been adjusted in size to accommodate the foreign language translations, but no FID has been moved in this simple example.

As indicated earlier, an information file, corresponding to translated image file 500 of FIG. 7, tabulates the changes between the original image and translated image. File 500 for this exemplary format may be stored, for instance, on a hard disk file designated "gclogo.term". Translated image file 500 corresponding to the translation from the display of FIG. 6 to the display of FIG. 9 is shown below in DISPLAY 3.

```
                       DISPLAY 3
NUMBER OF FIDs: 9
1     /FOR:
20    * GOC LOGON/OFF *
40    FECHA:
241   ENTRAR RRO:
481   ENTRAR PALABRA DE PASO:
561   (SI ES REQUERIDO)
801   EXTRAR CORRESPONDENCIA ?:
1041  ASIGNACION DE LAS TECLAS PF
1281  1:  CONSULTAR   -MUESTRA EL ESTADO DEL LOGON
      4:  ANADIR      -LOGON
      8:  REPONER     -REPONER LA PANTALLA
      10: ANULAR      -LOGOFF
NUMBER OF DATA FIELDS: 6
7     7      8
47    47     6  0AEDATE
252   253    3
497   505    8
815   828    1
1840  1840   80 OGOCERR
```

In DISPLAY 3, basically two sets of data are shown, namely, the set associated with the "NUMBER OF FIDs" and the set associated with the "NUMBER OF DATA FIELDS". As indicated, there are nine FIDs being tracked. For each such FID, there is an indication as to its starting location and then the actual FID is defined. For example, FID "FECHA" starts at character location 40, as noted earlier. (Not shown in DISPLAY 3 are the attributes associated with the FIDs. Their location in file 500 is discussed shortly.)

With respect to the data field set, there are six data fields being tracked. For each such data field, there is an indication as to the starting location in the original screen image, the starting location in the translated screen image, the field length and whether a conversion process applies in going from original-to-translated or vice versa. For example, the data field starting at location 47 is to undergo a conversion from original-to-translated (0 before "AEDATE") designated by the routine "AEDATE". This routine converts dates from month-/day/year to day/month/year. Also, the data field at location 1840 (the message line) is to be converted using the "GOCERR" database, as suggested earlier.

As a second example, the "gcocs1" format image considered in the discussion relating to FIGS. 2 and 3 is now translated via the format create controller process. FIG. 10 depicts the translated image corresponding to the original image of FIG. 2. The display of FIG. 10 is the screen presented to the foreign language user for fill-in. FIG. 11 shows a filled-in version of FIG. 10 just prior to the striking of the "enter" key by the foreign language user. It is noted that the foreign language user inputs data in a form that is understandable in either English or the foreign language, that is, the lower case notation is the same for both versions. FIG. 12 depicts the display on VDT 300 after host 100 has processed the contents of the display of FIG. 11. Certain data fields not populated upon the request are now populated upon the response: in particular, line 24 now contains an appropriate message. FIG. 12 is the Spanish language counterpart to FIG. 3. DISPLAY 4 below shows an excerpted version of the contents of translation file 500 for the translated "gcocs1" format.

```
                     DISPLAY 4
NUMBER OF FIDs: 93
1     /FOR
17    * TIRKS CONTROL DE ORDEN (ESPECIALES) *
   .
   .
   .
57    OIY:
80    CLO:
   .
   .
   .
320   TIPO ORD:
   .
   .
   .
1440  OBSERVACIONES:
   .
   .
   .
1673  ESTA-L
NUMBER OF DATA FIELDS: 113
7    7    8
62   62   8
65   65   1  0AEDATE
   .
   .
   .
405  410  6  0AEDATE 1AEDATE
421  427  6  0AEDATE 1AEDATE
   .
   .
1517 1436 2
   .
   .
1840 1840 80 0GOCERR
```

Figure 13:
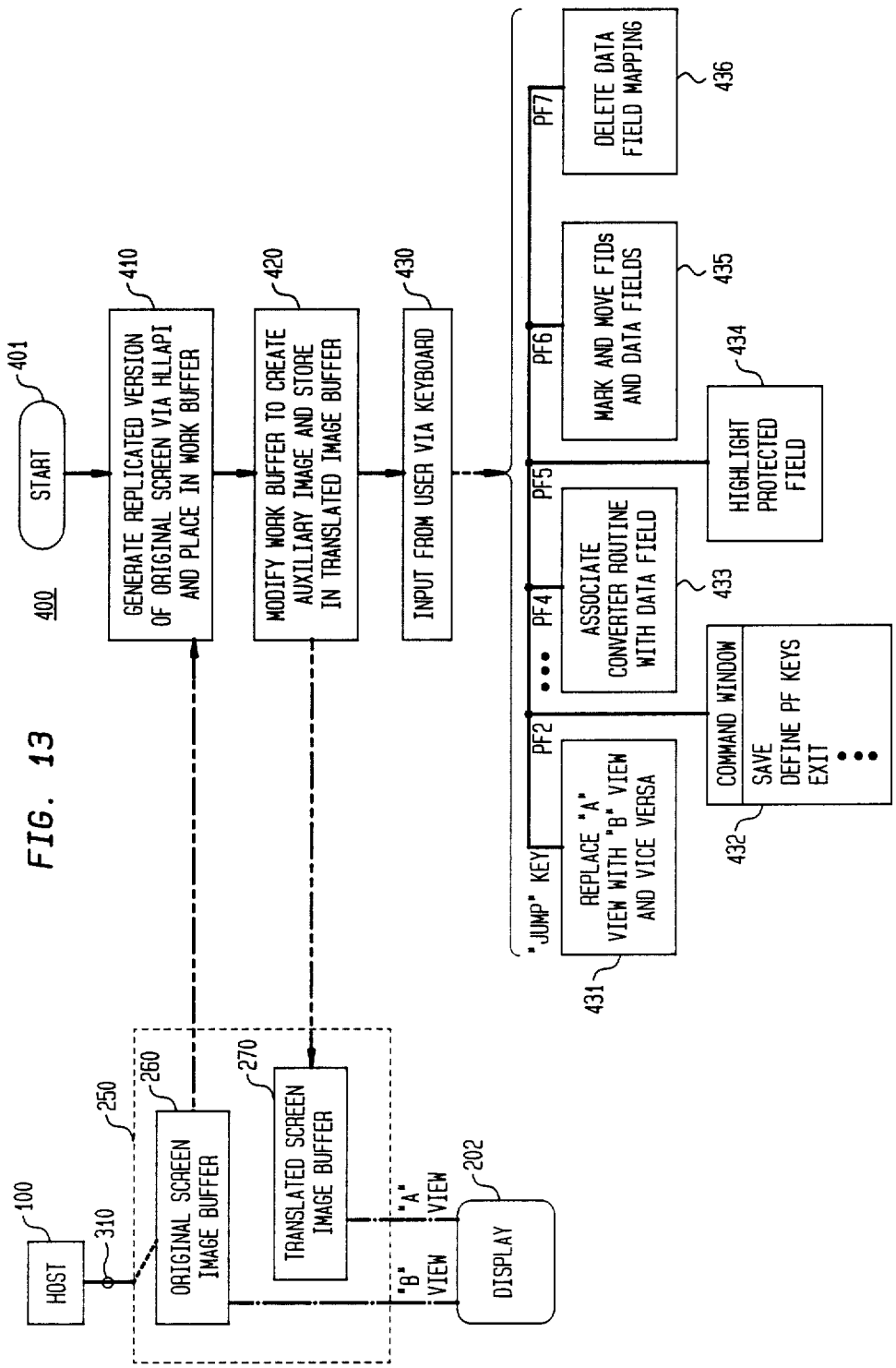
FIG. 13 is a block diagram representing the detailed processing effected by the format create controller depicted generically in FIG. 7.

The process flow of format create controller 400 is shown in greater detail by the block diagram of FIG. 13. When host 100 transmits the requested screen image, processor 250 captures the data stream from channel 310 and stores the stream in original screen image buffer 260. Processor 250 is configured upon initialization with at least two windows or views, namely, views A and B in FIG. 13, which may be called alternately into view on screen 202. As depicted, the B view displays the contents of buffer 260 whenever invoked by the appropriate keyboard entry.

After buffer 260 is filled, process 400 is started, as depicted by block 401. The first activity, shown by block 410, is that of generating a replicated version of original screen image buffer 260 and placing the replicated version in a work buffer (not shown) in processor 250. The generation of the replicated version is aided by the High Level Language Application Program Interface (HLLAPI) software system supplied as a standard product release by IBM. This software effects the transfer of memory contents associated with the terminal mode portion of VDT 300 to the personal computer mode portion of VDT 300. The process represented by block 420 is then automatically invoked to read attribute information from the work buffer to, for example, highlight unprotected data fields and select appropriate colors for display of the FIDs and the data fields. The modified work buffer is then stored in translated screen image buffer 270; recall the initial contents of buffer 270 contain the auxiliary image. The contents of buffer 270 are automatically displayed to the user, as view A, on screen 202. Process 400 then awaits keyboard input from the user, as suggested by block 430. FID modifications, data field conversion, and so forth are invoked through appropriate function keys; five exemplary keys are shown by blocks 432-436 in FIG. 13. Block 432 depicts the set of command level activities that may be invoked to operate on the work buffer. The SAVE command is ultimately the command used to write the contents of buffer 270 to translation file 500.

Block 433 associates a converter routine with a data field (e.g., AEDATE with the DATE data field.) Block 434 invokes a process to highlight protected data fields. The process of block 435 provides the editor-like functions to mark and move FIDs and data fields. Finally, block 436 is invoked to suppress mapping of data fields from the original to the translated image. The processing associate with block 431, the so-called "JUMP" key, is used to select which view (A or B) is desired by the user. Process 400 is terminated by invoking the window of block 432 and either saving buffer 270 in translation file 500 or exiting to initiate any new work activity.

Translation Execution Processing

Figure 14:
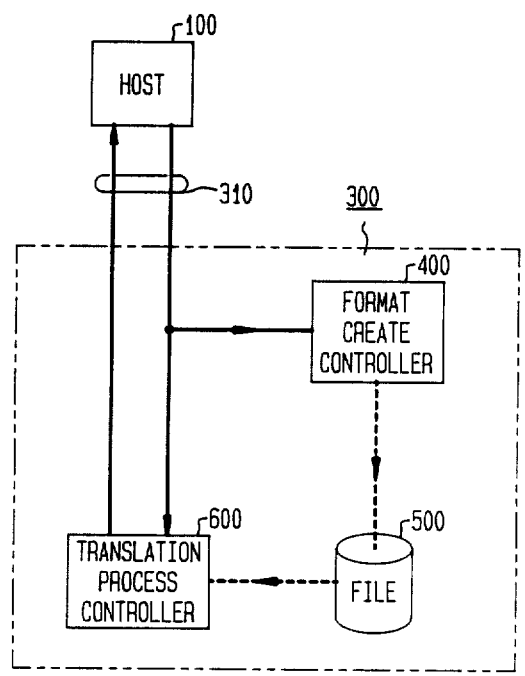
FIG. 14 is a block diagram depiction of the intermediate level processing showing its two components, namely, format create processing and translation execution processing.

As alluded to above, there is a second phase to the intermediate processing, namely, the translation execution process. This process performs the actual execution time translation and display of the request-response screens to the foreign language user. In typical fashion, host 100 transmits a screen display to VDT 300 and this transmission is intercepted by translation execution process controller 600, as depicted generally in FIG. 14. Process controller 600 determines initially the screen format being transmitted from host 100 over channel 310, which is now depicted in FIG. 14 as having two unidirectional paths corresponding to host-to-terminal transmissions and terminal-to-host transmissions, respectively. After determining the format, the translation file from file 500 corresponding to the previously translated format is read into controller 600 and translations commence. The foreign language FIDs for the format are translated to the foreign language and, upon completion of the translations, the translated image corresponding to the format is displayed on screen 202. The foreign language user may then fill the display with desired data. A filled-in screen was depicted in FIG. 11 for the "gcocs1" format. The foreign language user then indicates to controller 600 that the filled-in screen is to be transmitted by striking the appropriate "ready" key. The translated image, now with non-blank data fields, is again intercepted by controller 600. The entered data, if required, is converted within controller 600 and then entered into the proper locations on the English screen image. Once completed, the English screen image, along with the "ready" keystroke, is forwarded to host 100. Thus, controller 600 renders all foreign user terminal entries transparent to host 100.

The flow of translation execution process 600 is shown with detailed specificity by the block diagram of FIG. 15. The operation triggering process 600 is the transmission of an English screen to VDT 300 from host 100 via channel 310. The initial activity, as effected by the processing of block 610, is the determination of the English screen format name (e.g., "gclogo" or "gcocs1") returned by host 100. Once determined, the portion of translation file 500 corresponding to the format name is read into memory by the process represented by block 620. As the translation file for this particular format is read-in, a skeleton screen image buffer comprising only FIDs is constructed, as represented by block 630.

In FIG. 15, an expanded view of the translation file for a general format is shown to the right of file 500. As suggested above by DISPLAYS 3 and 4, there are basically two sets of data corresponding, respectively, to FID and DATA FIELD information. The FID information, besides containing the screen location and the FID itself, is now shown to contain the ATTRIBUTE parameter for each FID. From the attribute, screen location color requirements and highlighting, if any, are obtained. Whereas translation file 500 contains the ATTRIBUTE parameters for FIDs, the ATTRIBUTE parameters for DATA FIELD information are obtained directly from the format image received initially from the host. Data field attributes have a flag position to tabulate only those data fields that have data modified by the user once the translated screen image is presented to the user. Because of this flag, processing speed is increased since only changed data fields are returned for processing. Thus, as depicted by "loop" block 640, the first activity in the loop operation is to move the attribute of the data field to the skeleton screen buffer, as shown by block 641. The data field of the FID undergoing processing by the loop, called the "mapped" field in block 640, is then read from the intercepted English image by the process of block 643. If there is a conversion process in going from the original-to-translation (O--T) as determined by decision block 645, then the particular conversion routine listed in the DATA FIELD information for this particular FID is invoked by the process of block 647. The particular data either generated or passed directly, depending upon the test condition resulting from processing by block 645, is placed in the data buffer of the skeleton screen image; this operation is depicted by block 649. Upon completion of processing for all "mapped" FIDs, the translated screen image stored in the buffer is displayed to the user on VDT 300, as per block 650. This display is the only one actually viewed by the foreign language user. The English image version of the screen, depicted in FIG. 15 as also being received by VDT 300, remains in the background and is transparent to the foreign language user.

Process 600 is now placed in a wait mode awaiting user data field input and activation via a "ready" key; the wait mode state is depicted by block 660. When the "ready" key is depressed, VDT 300 sends the present contents of the foreign language screen image for processing, as represented by block 670. Again, block 670 depicts the initial processor in a loop having blocks 671, 673, 675 and 677 as remaining processing blocks. These latter four blocks represent the translation-to-original counterparts to blocks 643, 645, 647 and 649 described above in the original-to-translation direction. Because of the attribute flag, however, only modified data fields are processed. After all modified fields have been processed, the revised English screen version and the "ready" key are sent to host 100 via VDT 300; this is depicted by processing block 680.

This description of the processing represented by FIG. 15 forms one complete cycle of translation execution. The process repeats for successive screen images transmitted by host 100.

From the foregoing, it is evident that each foreign language interface (e.g., Spanish, German, French and so forth) to the host system resides in the translation file, which is a user-specified composite of individual translated screen images. Then, utilization of the host system by a non-English user merely involves the loading of the corresponding version of file 500 and invoking of translation execution.

It is to be understood that the above-described embodiment is simply illustrative of the application of the principles in accordance with the present invention. Other embodiments may be readily devised by those skilled in the art which may embody the principles in spirit and scope.

What is claimed is:

1. In an interactive-mode language translation system comprising a host interconnected with an access device arranged with a processor having a memory, a keyboard and a display screen, wherein a user selects a format via the keyboard and the host generates and sends to the access device an original image of the format which includes field identifiers and both protected and unprotected data fields, the method comprising the steps of
    saving the original image displayed in an original language in the memory of the processor,
    processing said saved original image to produce an auxiliary image having field identifiers and both protected and unprotected data fields corresponding to the original image,
    displaying on the screen said auxiliary image with its unprotected data fields highlighted,
    modifying via the keyboard any of said auxiliary image identifiers and data fields in accordance with user-defined customizing requirements to created a translated image, displayed in a replacement language,
    processing said stored original image and said translated image to generate a data file indicative of the contents of both said saved original image and said translated image, and
    storing said data file in the memory without overwriting said saved original image.

2. The method as recited in claim 1 wherein the step of modifying includes the step of replacing said auxiliary image identifiers expressed in a first language with identifiers expressed in a second language based on user input.

3. The method as recited in claim 1 wherein the step of modifying includes the step of substituting, based on input by the user, said auxiliary image identifiers as expressed in English with identifiers expressed in a predetermined foreign language.

4. The method as recited in claim 1 wherein the step of modifying includes the step of marking any of said auxiliary image identifiers or data fields and moving said any marked identifiers or data fields to other locations of said auxiliary image.

5. The method as recited in claim 1 wherein said step of modifying includes the step of associating a conversion routine as defined by the user via the keyboard with any of said auxiliary image data fields and said step of storing includes the step of saving said conversion routine in said memory in correspondence with its associated auxiliary image data field.

6. The method as recited in claim 1 wherein said step of modifying includes the step of highlighting any of said auxiliary image data protected fields according to user input via the keyboard.

7. In an interactive data entry system comprising a host and a terminal, wherein: (i) host format processing is initiated by a format request submitted from the terminal and a host response to the format request is the transmission to the terminal of an image corresponding to the format, the image displayable in a first language at the terminal; and (ii) host data processing is invoked from a user-filled format image displayed at the terminal and a host data processing response is a corresponding system-filled format image displayable at the terminal, both said user-filled format image and said system-filled format image including user-viewable information expressed in the first language, the method of deploying the system by a second language user comprising the steps of
    configuring the terminal with a processor and an associated memory,
    selecting a system format by the second language user and transmitting said selected format to the host from the terminal,
    returning from the host to the terminal a response image corresponding to said selected format and storing said response image in said associated memory, said response image being expressed in the first language,
    processing by said processor said stored response image together with a translation file stored in said associated memory to produce a translated image in the second language corresponding to said stored response image, said file having contents indicative of the relation between said stored response image and the second language counterpart of said stored response image,
    displaying said translated image in the second language at the terminal, said displayed translated image having terminal locations to be filled-in by the second language user,
    processing by said processor said filled-in terminal locations to map said filled-in locations into said stored response image so as to generate a filled-in, first language image of said stored response image,
    transmitting said filled-in image to the host to invoke host processing utilizing said filled-in image as input to the host, sending the system-filled image resulting from host processing to the terminal and storing said system-filled image in said memory, said system-filled image being expressed in the first language, processing by said processor said stored system-filled image together with said translation file to provide a filled-in translated image in the second language corresponding to said stored system-filled image, and displaying said filled-in translated image in the second language at the terminal.

* * * * *

UNITED STATES PATENT AND TRADEMARK OFFICE
CERTIFICATE OF CORRECTION

PATENT NO. : 4,870,610

DATED : Sep. 26, 1989

INVENTOR(S) : Daniel F. Belfer

It is certified that error appears in the above-identified patent and that said Letters Patent is hereby corrected as shown below:

Abstract, line 5, "transltion" should read --translation--

Column 1, title, "CUSTOMED" should read --CUSTOMIZED--.
Column 4, line 58, "700" should read --100--.
Column 13, line 57, "created" should read --create--.
Column 14, line 34, "displayabIe" should read --displayable--.

Signed and Sealed this

Fifteenth Day of September, 1992

Attest:

DOUGLAS B. COMER

*Attesting Officer*        *Acting Commissioner of Patents and Trademarks*